US012349250B2

United States Patent
Lapujade et al.

(10) Patent No.: US 12,349,250 B2
(45) Date of Patent: Jul. 1, 2025

(54) NIGHT VISION IMAGING SYSTEM (NVIS) COMPATIBLE LIGHTING WITH AN ADJUSTABLE MELANOPIC PHOTOPIC RATIO

(71) Applicant: GOODRICH LIGHTING SYSTEMS, INC., Phoenix, AZ (US)

(72) Inventors: Philippe G. Lapujade, Chandler, AZ (US); David K. McCombs, Tampa, FL (US)

(73) Assignee: GOODRICH LIGHTING SYSTEMS, INC., Phoenix, AZ (US)

( * ) Notice: Subject to any disclaimer, the term of this patent is extended or adjusted under 35 U.S.C. 154(b) by 352 days.

(21) Appl. No.: 18/098,859

(22) Filed: Jan. 19, 2023

(65) Prior Publication Data

US 2024/0251489 A1  Jul. 25, 2024

(51) Int. Cl.
| | |
|---|---|
| H05B 45/20 | (2020.01) |
| B60Q 3/43 | (2017.01) |
| B60Q 3/47 | (2017.01) |
| B64D 11/00 | (2006.01) |
| B64D 47/02 | (2006.01) |
| H05B 47/155 | (2020.01) |
| H05B 47/17 | (2020.01) |

(52) U.S. Cl.
CPC ............... *H05B 45/20* (2020.01); *B60Q 3/43* (2017.02); *B60Q 3/47* (2017.02); *H05B 47/155* (2020.01); *H05B 47/17* (2020.01); *B60Q 2800/30* (2022.05); *B64D 2011/0038* (2013.01); *B64D 47/02* (2013.01); *B64D 2203/00* (2013.01)

(58) Field of Classification Search
None
See application file for complete search history.

(56) References Cited

U.S. PATENT DOCUMENTS 4,242,497 A * 12/1980 Blount ............... C08G 12/40
521/154
4,671,411 A *  6/1987 Rehrig ............. B65D 21/048
294/169

(Continued)

FOREIGN PATENT DOCUMENTS

GB          2387528 B  *  7/2006 ......... A47G 23/0616

OTHER PUBLICATIONS

Squair, "Human engineering an Australia's F/A-18 night vision capability", Australian Computer Society Inc., dated Dec. 1, 2007, pp. 89-100.

(Continued)

*Primary Examiner* — Srinivas Sathiraju
(74) *Attorney, Agent, or Firm* — SNELL & WILMER L.L.P.

(57) ABSTRACT

A lighting system and assembly comprising a controller in operable communication with a light unit. The controller is configured to apply a lighting condition using the light unit for a target light color below an upper level of NVIS radiance while controlling a Melanopic-Photopic (M/P) ratio associated with the target light color, and also determine a color mixing for producing NVIS Green A light and NVIS white light for a plurality of levels of NVIS radiance which are less than a maximum NVIS radiance level for a set of M/P ratio values at an upper allowable limit and a set of M/P ratio values at a lower limit.

20 Claims, 8 Drawing Sheets

(56) References Cited

U.S. PATENT DOCUMENTS

| | | | | |
|---|---|---|---|---|
| 5,334,795 A * | 8/1994 | Chu | | C07C 2/66 |
| | | | | 585/446 |
| 6,004,534 A * | 12/1999 | Langer | | A61K 9/1273 |
| | | | | 424/9.4 |
| 6,786,617 B2 * | 9/2004 | Lemay | | B60Q 3/14 |
| | | | | 362/230 |
| 6,929,239 B1 * | 8/2005 | Colin | | F16K 99/0023 |
| | | | | 251/115 |
| 8,132,379 B2 * | 3/2012 | Zaveri | | B32B 5/245 |
| | | | | 52/311.1 |
| 8,277,596 B2 * | 10/2012 | Zaveri | | B32B 5/26 |
| | | | | 156/278 |
| 9,273,849 B2 * | 3/2016 | Schmid | | F21V 9/00 |
| 9,777,581 B2 * | 10/2017 | Nilsson | | B23P 11/02 |
| 9,927,562 B2 * | 3/2018 | Lemay | | G02B 5/208 |
| 9,928,761 B2 * | 3/2018 | Palanisamy | | G09G 3/004 |
| 9,957,058 B2 * | 5/2018 | Sjungargård | | B01D 61/58 |
| 10,171,956 B2 * | 1/2019 | Liu | | H04W 4/029 |
| 10,207,287 B2 * | 2/2019 | Samain | | D21H 17/06 |
| 10,344,619 B2 * | 7/2019 | Beach | | F01D 9/02 |
| 10,549,866 B1 * | 2/2020 | Lapujade | | G08G 5/55 |
| 10,773,826 B1 * | 9/2020 | Lapujade | | F21S 41/192 |
| 11,059,418 B2 * | 7/2021 | Lapujade | | H01L 25/0753 |
| 11,213,582 B2 * | 1/2022 | BenMohamed | | C12N 7/00 |
| 11,656,529 B2 * | 5/2023 | Guler | | G02F 1/3507 |
| | | | | 359/326 |
| 11,699,383 B2 * | 7/2023 | Martin | | H01L 25/167 |
| | | | | 345/166 |
| 11,842,699 B2 * | 12/2023 | Wyatt | | C09K 11/00 |
| 12,032,775 B2 * | 7/2024 | Jang | | G06F 3/04164 |
| 2002/0087601 A1 * | 7/2002 | Anderson | | H04N 1/00244 |
| | | | | 715/236 |
| 2002/0087622 A1 * | 7/2002 | Anderson | | H04N 1/00148 |
| | | | | 709/246 |
| 2007/0010848 A1 * | 1/2007 | Leung | | A61B 17/8858 |
| | | | | 606/198 |
| 2007/0192432 A1 * | 8/2007 | Anderson | | H04N 1/00244 |
| | | | | 709/217 |
| 2007/0260320 A1 * | 11/2007 | Peterman | | A61F 2/4455 |
| | | | | 623/17.11 |
| 2008/0209014 A1 * | 8/2008 | Anderson | | H04N 1/00148 |
| | | | | 709/219 |
| 2011/0005147 A1 * | 1/2011 | Zaveri | | B44C 5/0461 |
| | | | | 52/311.1 |
| 2012/0132356 A1 * | 5/2012 | Zaveri | | B32B 5/26 |
| | | | | 156/280 |
| 2013/0236647 A1 * | 9/2013 | Samain | | B05D 3/007 |
| | | | | 118/63 |
| 2013/0237281 A1 * | 9/2013 | Murphy | | H04M 1/2474 |
| | | | | 455/566 |
| 2014/0261702 A1 * | 9/2014 | Meng | | C23C 16/4412 |
| | | | | 138/37 |
| 2016/0074813 A1 * | 3/2016 | Sjungargård | | B01D 71/024 |
| | | | | 210/651 |
| 2018/0109926 A1 * | 4/2018 | Liu | | H04W 4/40 |
| 2018/0141677 A1 * | 5/2018 | Lapujade | | F21K 9/68 |
| 2019/0209858 A1 * | 7/2019 | Slaughter | | A61N 5/0613 |
| 2020/0043307 A1 * | 2/2020 | Lapujade | | G08B 7/062 |
| 2020/0046827 A1 * | 2/2020 | BenMohamed | | C12N 7/00 |
| 2020/0183516 A1 * | 6/2020 | Jang | | G06F 3/0443 |
| 2020/0307449 A1 * | 10/2020 | Lapujade | | F21V 3/00 |
| 2020/0337124 A1 * | 10/2020 | Sengodan | | H03K 19/20 |
| 2020/0337125 A1 * | 10/2020 | Sengodan | | H05B 45/345 |
| 2022/0082827 A1 * | 3/2022 | Micusik | | G06F 3/013 |
| 2022/0398987 A1 * | 12/2022 | Wyatt | | H01L 25/0753 |
| 2023/0220983 A1 * | 7/2023 | Rao | | F21V 29/90 |
| | | | | 219/220 |
| 2023/0341117 A1 * | 10/2023 | Kodati | | F21V 23/0471 |
| 2024/0032167 A1 * | 1/2024 | Zele | | H05B 45/20 |

OTHER PUBLICATIONS

European Patent Office, European Search Report dated Apr. 29, 2024 in Application No. 23220735.7.

European Patent Office, European Office Action dated Feb. 17, 2025 in Application No. 23220735.7.

* cited by examiner

| LED | NVIS G, Low M/P | NVIS G, High M/P | NVIS W, Low M/P | NVIS W, High M/P |
|---|---|---|---|---|
| Blue 1 | | | 14% | |
| Cyan | | 12% | | 36% |
| Green 1 | 73% | 59% | | 9% |
| Green 2 | 27% | 29% | 14% | 9% |
| Amber 1 | | | 71% | 45% |
| | | | | |
| x | 0.2733 | 0.1912 | 0.3825 | 0.2795 |
| y | 0.6810 | 0.4634 | 0.4326 | 0.3293 |
| z | 0.0457 | 0.3454 | 0.1849 | 0.3912 |
| u' | 0.1029 | 0.0935 | 0.2060 | 0.1749 |
| v' | 0.5768 | 0.5100 | 0.5243 | 0.4636 |
| CCT | 6382 | 9981 | 4261 | 8532 |
| M/P | 0.75 | 2.35 | 0.56 | 1.54 |
| $NR_A$ at 0.1 fL | 5.44E-11 | 9.38E-11 | 1.74E-10 | 1.50E-10 |
| $NR_B$ at 0.1 fL | 3.40E-12 | 4.36E-12 | 5.91E-12 | 5.62E-12 |

FIG.4

NIGHT VISION IMAGING SYSTEM (NVIS) COMPATIBLE LIGHTING WITH AN ADJUSTABLE MELANOPIC PHOTOPIC RATIO

FIELD

The present disclosure relates generally to lighting systems and methods and, more particularly, to lighting systems for aircraft Night Vision Image System (NVIS) constrained by certain NVIS compatibilities in accordance with melanopic ratios that balance a visible color with an infrared color.

BACKGROUND

Advanced full-cabin lighting system can be attuned to human biology to reduce passenger jetlag, and color-optimized to improve the appearance of materials, food and fixtures throughout the cabin. The lighting can be autonomized to intelligently synchronize with real-time flight data to enable predictive and independent functionality.

Certain aircraft may contain night vision imaging systems (NVISs) compatible lighting equipment, allowing aircraft personnel to utilize NVIS goggles to conduct tasks at night. Conventional NVISs compatible lighting commonly utilize a white light source (for example, incandescent, halogen, or LED) combined with one or more optical filters that remove certain unwanted wavelengths of light, while maintaining the target color. However, such optical filters may be expensive, increase manufacturing times, and cause light loss as the light moves through the optical filters.

SUMMARY

An article of manufacture is disclosed herein. The article of manufacture includes a tangible, non-transitory computer-readable storage medium having instructions stored thereon that, in response to execution by a processor, cause the processor to perform operations comprising: command, by the processor, of a lighting system to achieve a target light color without exceeding a maximum limit of Night Vision Imaging Systems (NVIS) radiance while controlling a Melanopic-Photopic (M/P) ratio associated with the target light color; and determine, by the processor, a color mixing for producing NVIS Green A light and NVIS white light for a plurality of levels of NVIS radiance which are less than a maximum limit of NVIS radiance for a set of M/P ratio values at an upper allowable limit and a set of M/P ratio values at a lower limit.

In various embodiments, the article of manufacture further includes setting, by the processor, a visual color brightness comprising a set of values of NVIS Green A light and of a NVIS white light with high and low M/P ratios.

In various embodiments, the article of manufacture further includes operating, by the processor, a singular lighting device in a plurality of modes at least comprising an NVIS compatible mode and a visible mode without restrictions.

In various embodiments, the singular lighting device is configured with a set of operating modules to correspond to the plurality of modes.

In various embodiments, the article of manufacture further includes setting, by the processor, the singular lighting device in at least one of the plurality of modes that at least comprise an NVIS compatible mode and a normal white light mode, while controlling a range of wavelength that induces a melanopic response.

In various embodiments, the singular lighting device comprises a plurality of light emitting diodes (LEDs) configured in multiple light colors positioned in a linear manner to provide a mood lighting mode with at least an optional NVIS compatible mode.

In various embodiments, a lighting system is disclosed. The lighting system includes a plurality of light emitting diodes (LEDs); and a controller in operable communication with the plurality of LEDs, the controller configured to cause the plurality of LEDs to: output a target light color below a maximum level of NVIS radiance while controlling a Melanopic-Photopic (M/P) ratio associated with the target light color; and determine a color mixing for producing NVIS Green A light and NVIS white light for a plurality of levels of NVIS radiance which are less than a maximum level of NVIS radiance associated with either an upper limit of an M/P ratio and a lower limit of an M/P ratio.

In various embodiments, the controller is configured to adjust the plurality of LEDs to output the target color with a visual brightness below a maximum NVIS radiance value for NVIS light and associated with at least one of an NVIS green A light or a NVIS white light with the upper limit of the M/P ratio or the lower limit of the M/P ratio.

In various embodiments, the controller is configured to operate a single lighting device in either an NVIS compatible mode or a visible mode wherein the visible mode is unrestricted.

In various embodiments, the controller controls a plurality of modules disposed in the single lighting device that each operate in respective operating modes to output the target light color below the upper level of NVIS radiance while an M/P ratio is controlled.

In various embodiments, the controller is configured to set a single light device in at least a mode that comprises a NVIS compatible mode or a normal white light mode.

In various embodiments, the plurality of light emitting diodes (LEDs) disposed in the single light device to enable an output of multiple colors to provide at least a mood lighting mode and a NVIS compatible light mode.

In various embodiments, a light assembly is disclosed. The light assembly includes a controller in operable communication with a light unit, the controller configured to: apply a lighting condition using the light unit comprising a target light color below an upper level of NVIS radiance while controlling a Melanopic-Photopic (M/P) ratio associated with the target light color; and determine a color mixing for producing NVIS Green A light and NVIS white light for a plurality of levels of NVIS radiance which are less than a maximum NVIS radiance level for a set of M/P ratio values at an upper allowable limit and a set of M/P ratio values at a lower limit.

In various embodiments, the controller is configured to set a visual color brightness comprising a set of values of NVIS Green A light and of a NVIS white light with either the upper limit of the M/P ratio or the lower limit of the M/P ratio.

In various embodiments, the controller is configured to operate a singular lighting device in a plurality of modes at least comprising an NVIS compatible mode and a visible mode without restrictions.

In various embodiments, the singular lighting device is configured with a set of operating modules to correspond to the plurality of modes.

In various embodiments, the controller is configured to set the singular lighting device in at least one of a plurality of modes comprising an NVIS compatible mode and a normal white light mode, while controlling a melanopic response.

In various embodiments, the singular lighting device comprises a plurality of light emitting diodes (LEDs) configured in multiple light colors positioned in a linear manner to provide a mood lighting mode with an optional NVIS compatible mode.

In various embodiments, the controller is configured to output a mode of the active state of the low M/P ratio with the NVIS Green A and another active state of the low M/P ratio with the NVIS white without NVIS goggle.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 4 illustrates a table of values of color compositions of target colors for both NVIS Green A and NVIS White with high and low M/P ratios in accordance with various embodiments.

DETAILED DESCRIPTION

Figure 1:
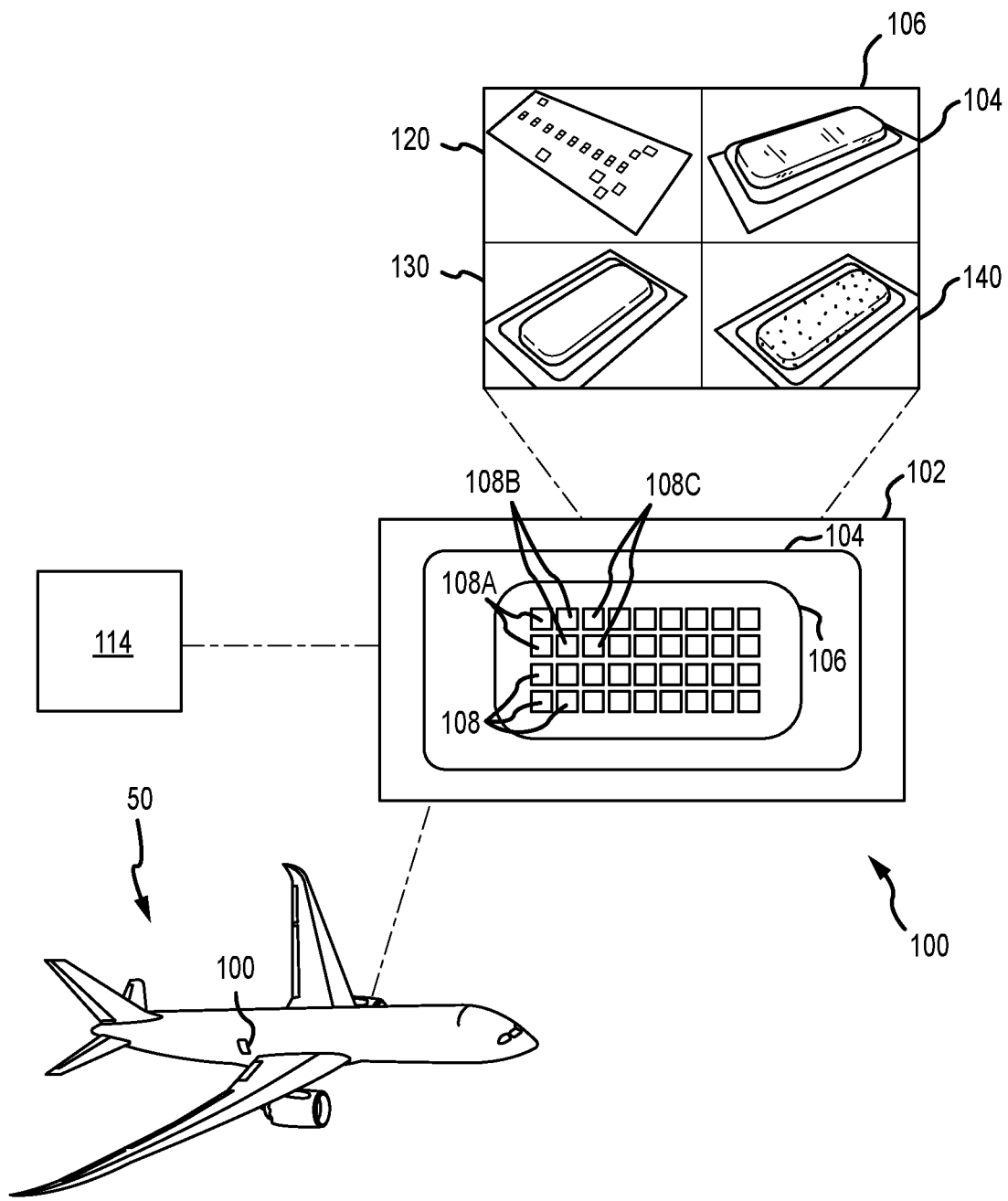
FIG. 1 illustrates a diagram of a multi-mode NVIS-compatible lighting system in an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

For example, in the context of the present disclosure, methods, systems, and articles may find particular use in connection with aircraft NVISs. However, various aspects of the disclosed embodiments may be adapted for performance in a variety of other systems. Accordingly, numerous applications of the present disclosure may be realized.

The NVIS radiance and color requirements of the night vision compatibility requirement of MIL-STD-3009 can be achieved using a white light source (incandescent, halogen, LED) combined with an optical filter that removes unwanted near infrared light while maintaining a target color. However, using an optical filter to achieve the NVIS radiance and color requirements but can increase the cost, availability, tolerance (optical), potential weight, and light loss of the lighting system assembly. The optical filter does not allow for a configuration of a single lighting unit into an NVIS compatible mode and a non-restricted visible mode as it uses an assembly comprising dual mode lights in separate modules to cover the visible white light mode and the NVIS green mode or other NVIS compatible mode configured.

In various embodiments, the present disclosure describes a system, method and apparatus for a lighting unit that can be configured using a single light source (or a configuration comprising a light source cluster) to produce NVIS compatible lighting in accordance with MIL-SDT-3009. The MIL-SDT-3009 requirement identifies the emission characteristics of aircraft lighting and display equipment that is intended for use with night vision imaging systems (NVIS). It is applicable to all systems, subsystems, component equipment, and hardware that provide the lighting environment on aircraft where NVIS are employed. The lighting unit is configured using the single light source (or the light source cluster) to produce MIL-SDT-3009 compliant NVIS radiance and color without the added optical filtering.

Referring to FIG. 1, a lighting system of an aircraft 50 is shown, according to various embodiments. The aircraft 50 may be any aircraft such as an airplane, a helicopter, or any other aircraft. The aircraft 50 may include lighting systems of various lighting units 100 that emit visible light to the interior space (i.e., cabin and cockpit) of the aircraft 50. In various embodiments, a plurality of spectral weighting modes may be provided, controlled, and switched in a plurality of modes for the lighting unit 100, enhancing a desired cabin feel/experience, in accordance with various flight phases.

In various embodiments, the lighting unit 100 can comprise a singular lighting device that can be configured in MIL-STD-3009 compliant NVIS Green A (i.e., 530 nm Green centered light) as a single lighting device 140, and in NVIS White as a single lighting device 130. The single lighting device (130, 140) may be configured to be dynamically adjustable to achieve at least two NVIS compatible modes that comprise high and low Melanopic-to-Photopic (M/P) energy ratios to promote alertness to passengers when set in an NVIS mode to cause a high melanopic response (i.e., high M/P) or to promote resting when set in an NVIS mode to cause a low melanopic response (i.e., low M/P).

In various embodiments, the lighting unit 100 may include circuitry 120, and a controller 114 for the multi-mode NVIS operation. In various embodiments, the lighting unit 100 may be configured as a multi-mode NVIS compatible lighting system with one or more types of light sources 108 configured in one or more colors.

In various embodiments, the lighting unit 100 is configured with a frame 102 that includes a plurality of light sources 108, that may be arranged in an array or may be linearly arranged (i.e., LED wash light). In implementation, a single or singular lighting source can be composed of a single array of light-emitting diodes ("LEDs") that are configured into multiple sets (rows) of different colored LEDs that make up the plurality of light sources 108. Hence, the plurality of light sources 108 are configured as a single lighting or light source in the lighting unit 100. The lighting unit 100 may include an optical diffuser 104 with the plurality of light sources 108 and through a window 106. The plurality of light sources 108 may include a first light source 108A, a second light source 108B, and a third light source 108C.

In various embodiments, the lighting unit 100, the plurality of light sources 108 may include a plurality of light-emitting diodes ("LEDs") where each LED in the plurality of LEDs is configured to emit electromagnetic radiation in a predetermined wavelength. Additional details pertaining to the lighting unit 100, the circuitry 120, and the controller 114 are described below.

In various embodiments, the lighting unit 100 comprises an array of discrete LEDs controlled to blend their respective radiations to collectively produce a desired color quality, color saturation, and color brightness of electromagnetic radiation. In various embodiments, the lighting unit 100 can be configured to transition between various spectral weighting modes by the controller 114, which are configured to generate a desired effect by optimizing a predetermined variable (e.g., CRI, brightness, lumens, etc.) within a predetermined domain (e.g., chromacity coordinates (x,y), color temperature (Kelvin), relative brightness (%), etc.).

The particular implementations shown and described herein are illustrative examples of an LED lighting assembly of a lighting unit 100, and are thus not intended to otherwise limit the present disclosure. For the sake of brevity, conventional electronics other components of the circuitry (such as power supplies and power modulators) may not be described in detail. The circuitry 120 is electrically coupled to the lighting unit 110 to supply respective driving signals to each of the LEDs. In various embodiments, the circuitry 120 is shown in FIG. 1 to switch the single lighting device between a set of green LEDs and white LEDs where the green LED has a narrower wavelength band.

In various embodiments, the lighting unit 100 may be replicated/repeated along a strip of circuit board. In various embodiments, the lighting unit 100 may include a diffuser lens (optical diffuser 104) covering the LEDs (light sources 108), and these lens(es) may comprise a glass material, a polymeric material, such as a polymethyl methacrylate material, and/or a polyamide material, among others.

In various embodiments, the controller 114 of the lighting unit 100 may be affixed/integrated into the circuitry 120 or the controller 114 may be integrated into computer systems onboard an aircraft 50.

In various embodiments, the controller 114 comprises a processor. In various embodiments, the controller 114 is implemented in a single processor. In various embodiments, the controller 114 may be implemented as (and include) one or more processors and/or one or more tangible, non-transitory memories and be capable of implementing logic. Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. The controller 114 may comprise a processor configured to implement various logical operations in response to execution of instructions, for example, instructions stored on a non-transitory, tangible, computer-readable medium (i.e., the memory) configured to communicate with the controller 114. Any number of conventional techniques for electronics configuration, signal processing and/or control, data processing may be employed. Also, the processes, functions, and instructions may can include software routines with processors, etc.

In various embodiments, the lighting unit 100 disclosed facilitates application of spectral weighting modes. The "spectral weighting mode" is customizable and adaptable to achieve a CRI with levels of melanopic sensitivity effect by optimizing a predetermined variable (e.g., CRI, brightness, lumens, etc.) within a predetermined domain (e.g., chromacity coordinates (x,y), color temperature (Kelvin), relative brightness (%), etc.).

In various embodiments, the controller 114 can be programmed based on flight management data received from various avionic systems to configure a plurality of melanopic levels for desired effects associated with flight phases. For example, during an on boarding or arrival flight phase, the controller 114 can determine a desired melanopic effect under a spectral weighting mode.

In various embodiments, the controller is configured to enable NVIS compatibility as a function of the ratio of visible color and infrared color to achieve a certain color light constrained in accordance with one or more NVIS compatibility levels. In various embodiments, one or more additional constraints are directed to outputted color lights with high melanopic-to-photopic ratio or low melanopic-to-photopic ratio. This enables different light mode settings corresponding to the high and low melanopic photopic ratio to cause different levels of stimulation or sleepiness. In various embodiments, by varying the visual proportional output of the first light source 108A, the second light source 108B, and the third light source 108C, the multi-mode NVIS compatible light system (i.e., the lighting unit 100) can achieve the target color of NVIS white or NVIS Green A.

Figure 2:
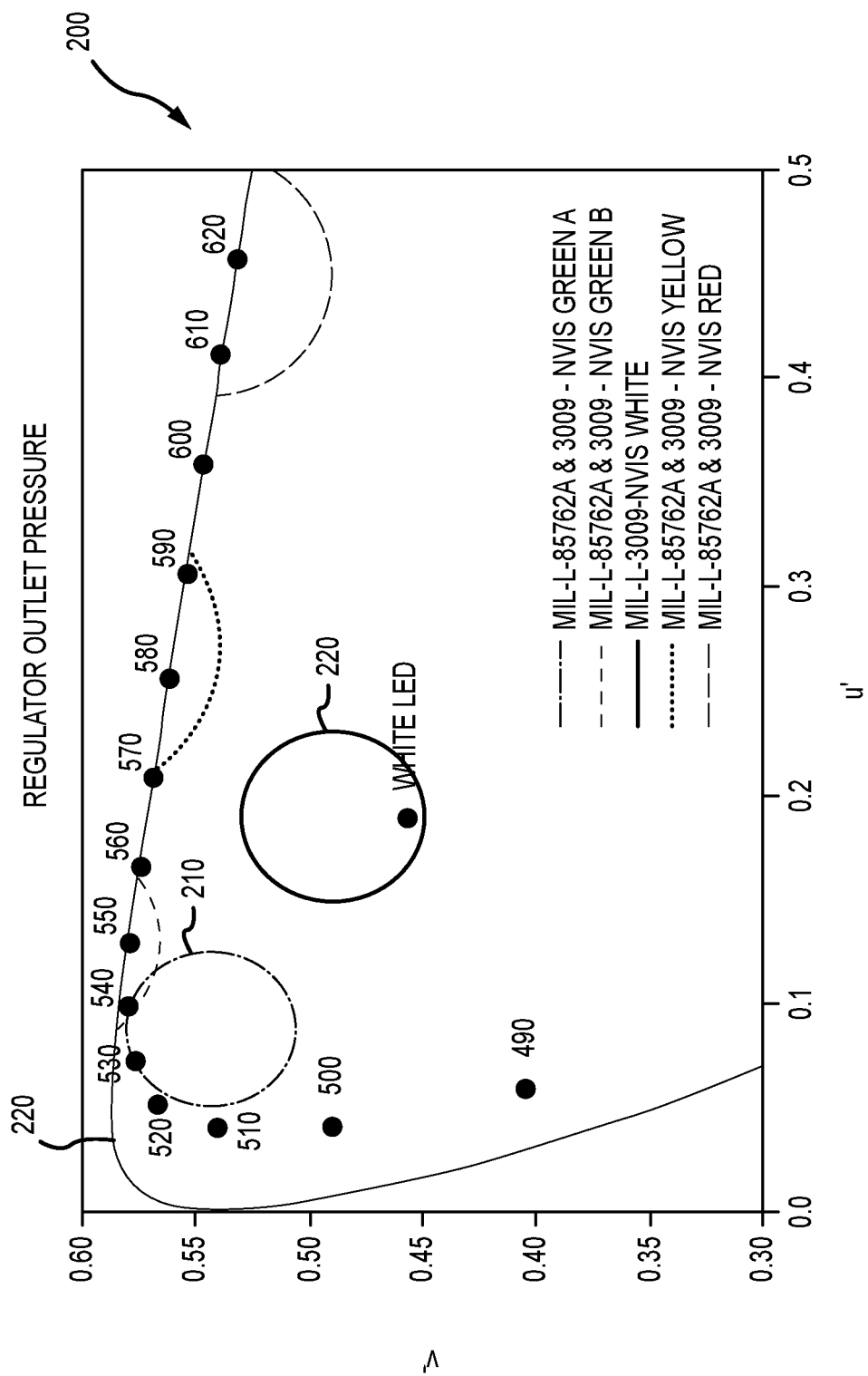
FIG. 2, a color space chromaticity diagram from the International Commission on Illumination ("CIE"), is illustrated that defines a bounded chromatic region with LED dominant wavelength versus color in accordance with various embodiments.

In various embodiments, and referring to FIG. 2, a color space chromaticity diagram from the International Commission on Illumination ("CIE"), is illustrated that defines a bounded chromatic region with LED dominant wavelength versus color in accordance with various embodiments. In various embodiments, in FIG. 2 the LEDs can be configured with dominant wavelength in a range between 530 nm and 540 nm (in area 210) to have potentially NVIS Green A light, and mostly at ambient temperature around 25 deg C. (77 deg F.). In implementation, a narrow range in the binning values (area 210) of the NVIS green light wavelength is preferred to for the NVIS Green A color desired, and the NVIS Green A light can be caused to shift outside the boundary 220 with ambient temperature, and current fluctuation. In various embodiments, the LEDs may be grouped together or binned in a set of wavelength values that fall into an NVIS white light area (boundary 220) which does not exceed the maximum (upper limit) NVIS radiance requirement by a certain order of magnitude. In either case, instead of requiring a special optical filter to compensate for the temperature and current fluctuation, a mix of colors is configured to generate the NVIS compatible color mode. In various embodiments, to create NVIS compatible white color light, a set of blue, green and amber colored LED are configured for color mixing without using a white LED for producing the NVIS compatibly white light as use of the white LED will or can result in higher than allowable amounts of red and infrared light for NVIS compatibly (i.e., with using white LEDs is within a wavelength of the NVIS white color boundaries, the NVIS radiance that results will exceed the limit for the MIL-STD-3009).

Figure 3:
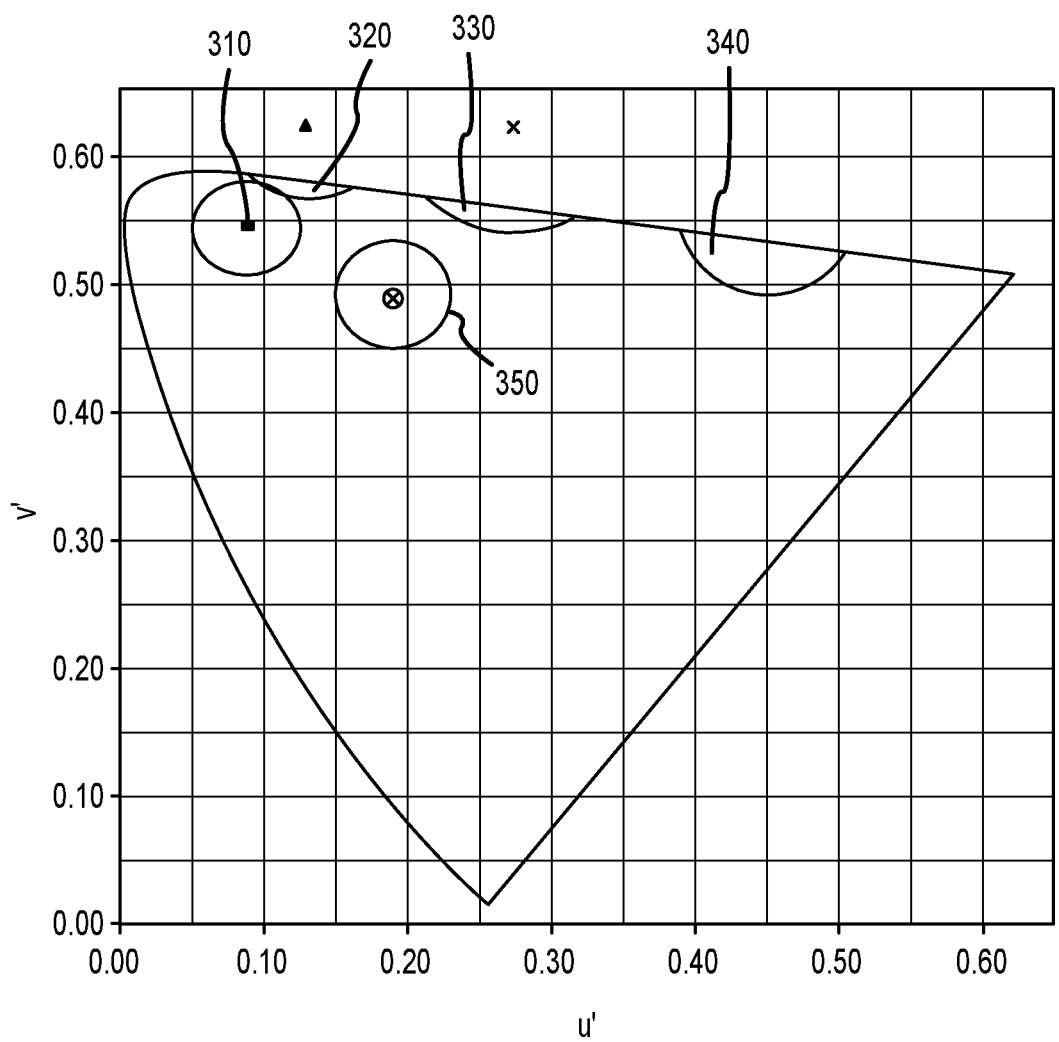
FIG. 3 illustrates a chromaticity diagram of output NVIS colors produced by a multi-mode NVIS-compatible lighting system, in accordance with various embodiments.

In FIG. 3, there is shown a color space chromaticity diagram 300 ("diagram") for various NVIS colors in a bounded area in accordance with various embodiments. FIG. 3 illustrates color spaces (or boundaries) for NVIS Green A 310, NVIS Green B 320, NVIS Yellow 330, NVIS Red 340, and NVIS white 350. When producing the different light color for NVIS compatible lighting, additional considerations may be made by the controller for inducing the melanopic response to control the Melanopic-Photopic (M/P) ratio to either promote resting (lower M/P), or to promote alertness (higher M/P).

In various embodiments, the controller can control the plurality of LEDs in different combinations of LED colors to produce the MIL-STD-3009 compliant NVIS Green A 310 or NVIS White 250. The primary color baseline of LED colors can include amber, Green 1, Green 2, Cyan and Blue of the plurality of color LEDs used in the lighting unit.

FIG. 4 illustrates a table of values of color compositions of target colors for both NVIS Green A and NVIS White with high and low M/P ratios in accordance with various embodiments. The table in FIG. 4 shows examples of color mixes of compositions of Blue 1, Cyan, Green 1, Green 2, and Amber 1 for NVIS Green A and NVIS White, Class A and Class B, with low and high M/P ratios. In various embodiments, for reference, the NVIS Radiance limits (NR) are: NVIS White (for utility, map, work, inspection), Class A and Class B, NR at 0.1 fL<1.00E-09; Green A (Primary, Secondary, Illuminated Controls, Compartment—Utility, Map, Work, Inspection—Caution and advisory), Class A and Class B, NR at 0.1 fL<1.70E-10.

Figure 5:
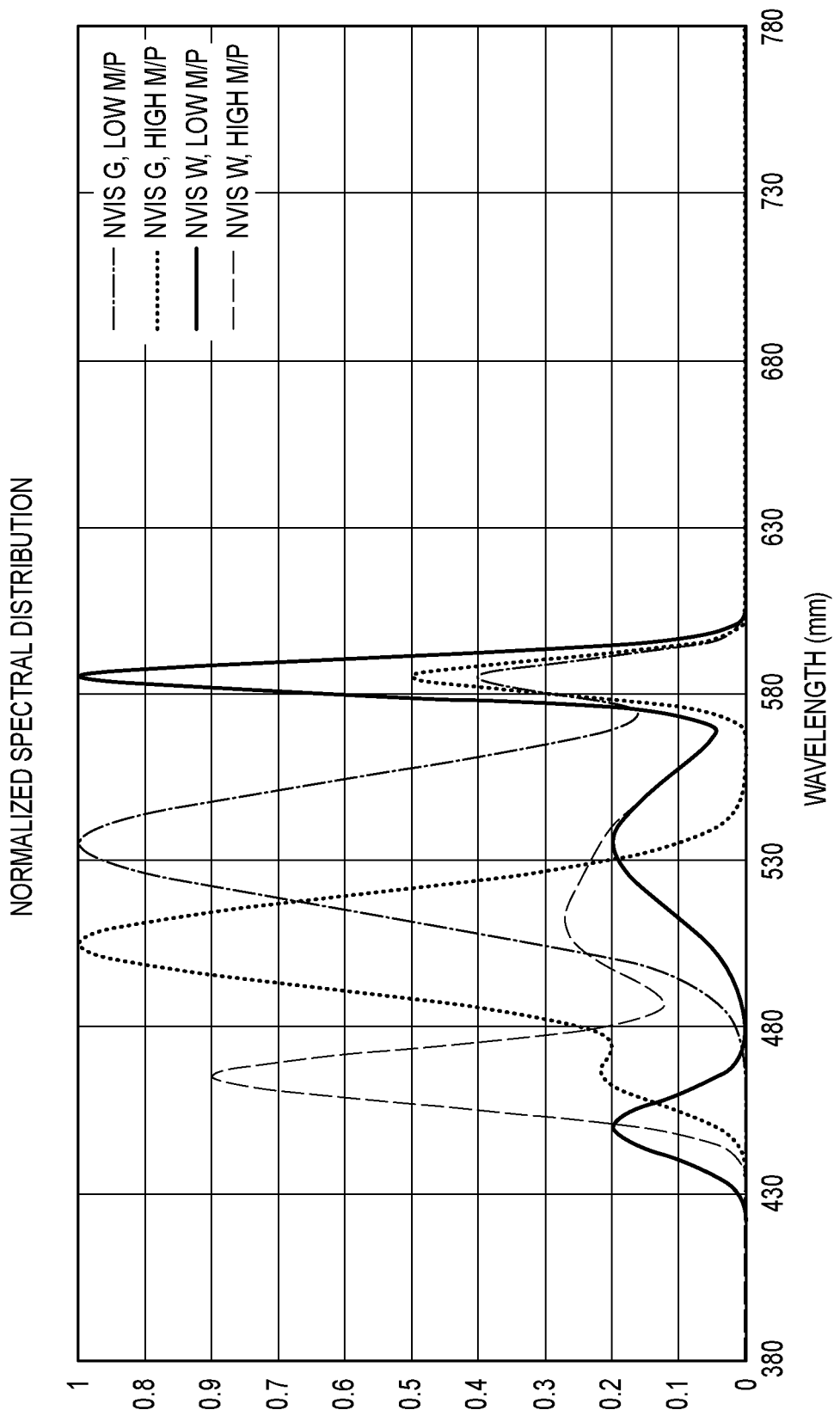
FIG. 5 illustrates a plot of combinations of a normalized spectra of mixed color lights of colors in the table of FIG. 4 achievable by a multi-mode NVIS-compatible lighting system, in accordance with various embodiments.

FIG. 5 illustrates a graph of a plot of combinations of a normalized spectra of mixed color lights of colors in the table of FIG. 4 in accordance with various embodiments. In FIG. 5, there is shown an example of a set of colors of NVIS Green A low M/P, NVIS Green high M/P, NVIS White low M/P, and NVIS White high M/P at wavelengths that are at the boundaries of the color range to maximize or minimize the M/P ratio for inducing the melanopic response.

Figure 6:
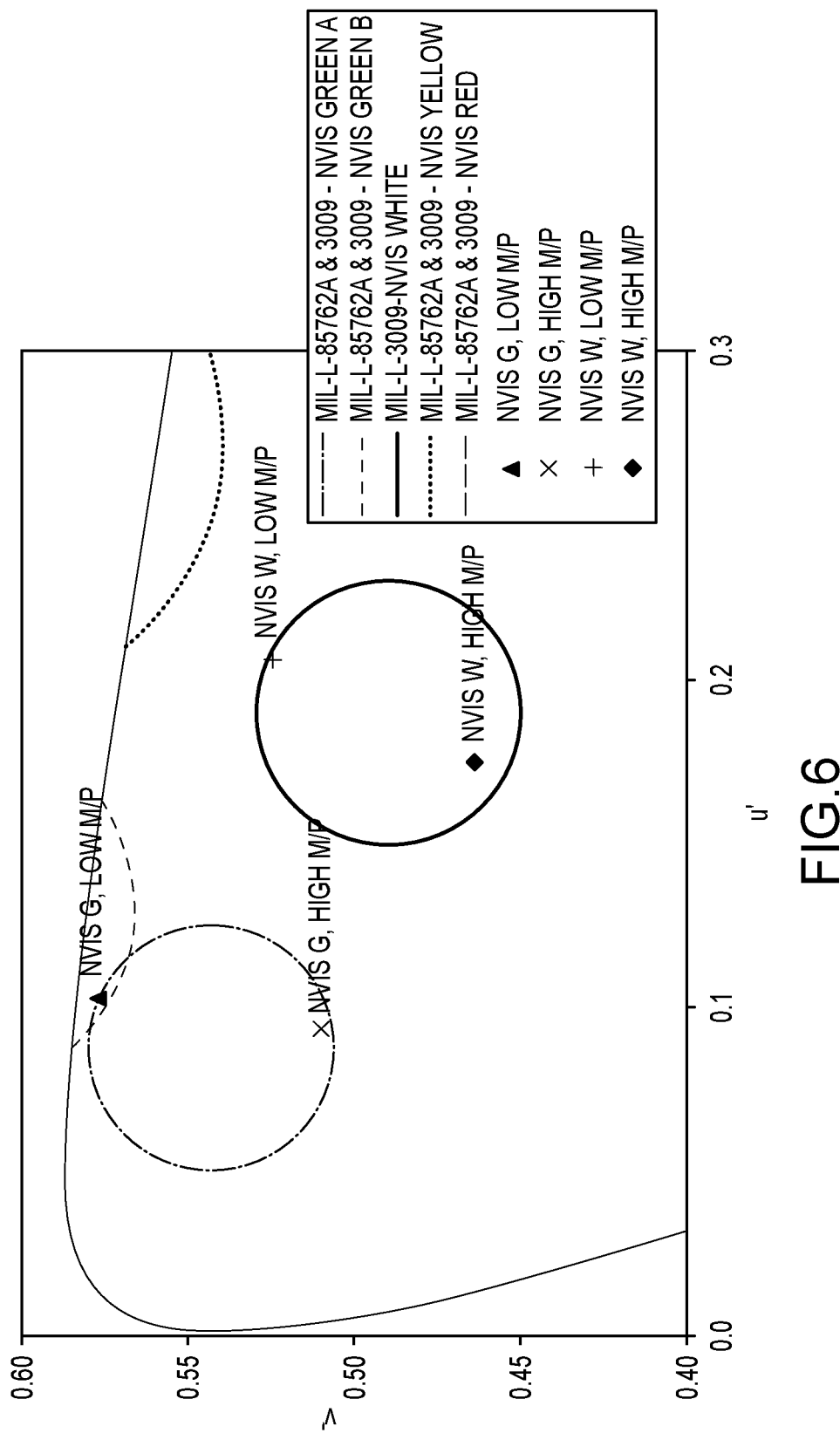
FIG. 6 illustrates a chromaticity diagram of a bounded area for NVIS Green A with low M/P and high M/P and NVIS white with low M/P and high M/P, NVIS Green B, and NVIS Yellow of the normalized spectra of mixed color lights of FIG. 5 in accordance with various embodiments.

FIG. 6 illustrates a chromaticity diagram of a bounded area for NVIS Green A with low M/P and high M/P and NVIS white with low M/P and high M/P, NVIS Green B, and NVIS Yellow of the normalized spectra of mixed color lights of FIG. 5 in accordance with various embodiments.

The instructions stored on the memory of the controller 114 may be configured to perform various operations. The schematic flow charts disclosed further herein include various exemplary controller methods 700 in FIG. 7 that the processor of the controller 114 may perform. Generally, the controller 114 electrically coupled to the circuitry 120 and is configured to transition between, by the processor, to various NVIS compatible modes. Controlling the spectral weighting modes of the light of the LEDs may include blending the electromagnetic radiation of the LEDs in a manner to achieve a desired effect by optimizing a predetermined variable for melanopic sensitivity within a predetermined domain.

Figure 7:
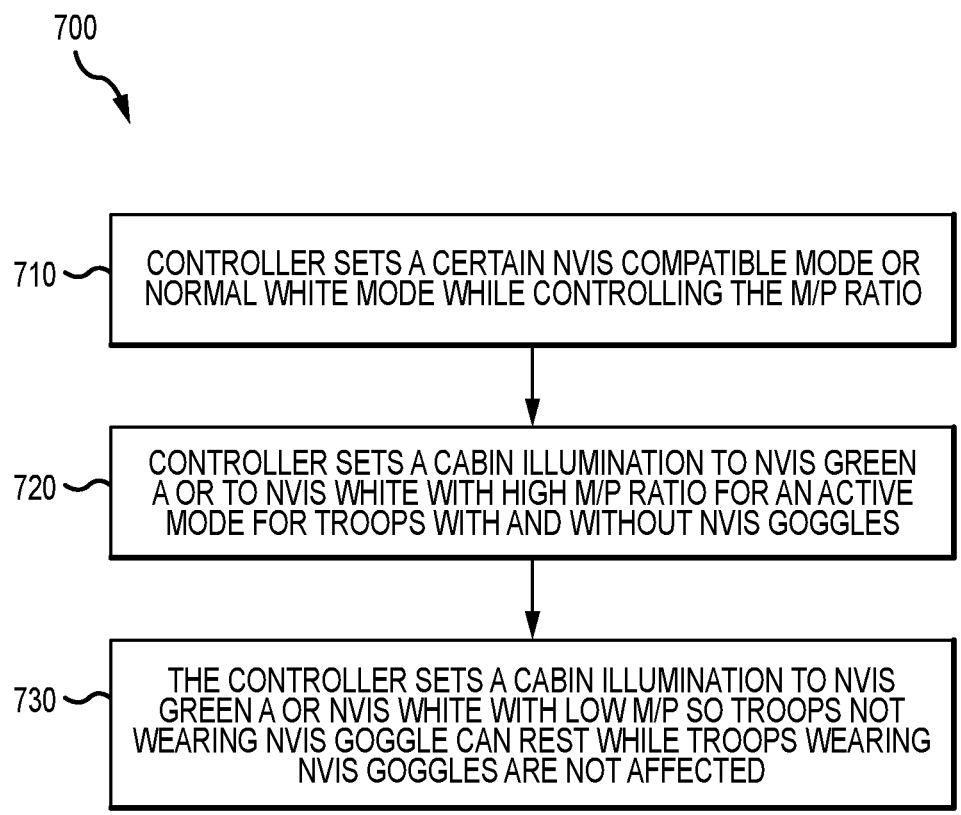
FIG. 7 is a schematic flow diagram showing a controller method, in accordance with various embodiments.

In FIG. 7, at step 710 a controller 114 that comprises one or more processor configured with a set of instructions to generate a desired melanopic response in lights can be set to NVIS compatible modes (besides "normal" white modes), while controlling the melanopic response (high or low). At step 720, the cabin illumination can be set by the controller 114 to NVIS Green A or to NVIS White, High M/P. In this setting, it is desired that most or all passengers being conveyed desire to be active whether or not one or more passengers are, are wearing NVIS goggles.

At step 730, the cabin illumination can be set by the controller to NVIS Green A or NVIS White, Low M/P so the passengers not wearing NVIS goggles can rest while the passengers wearing NVIS goggles are not affected since the goggles prevent reception of a low melanopic response by a display or other barrier.

In various embodiments, the lighting unit 100 does not comprise a special filter for the NVIS compatible application, which results in lower cost as additional LEDs are cheaper than NVIS filters. Eliminating the filter simplifies procurement, assembly, and can lower weight, and reduce light loss. The absence of the optical filter offers a design opportunity to operate a single light configuration into an NVIS compatible mode and a non-restricted visible mode with specific modules for each mode.

Figure 8:
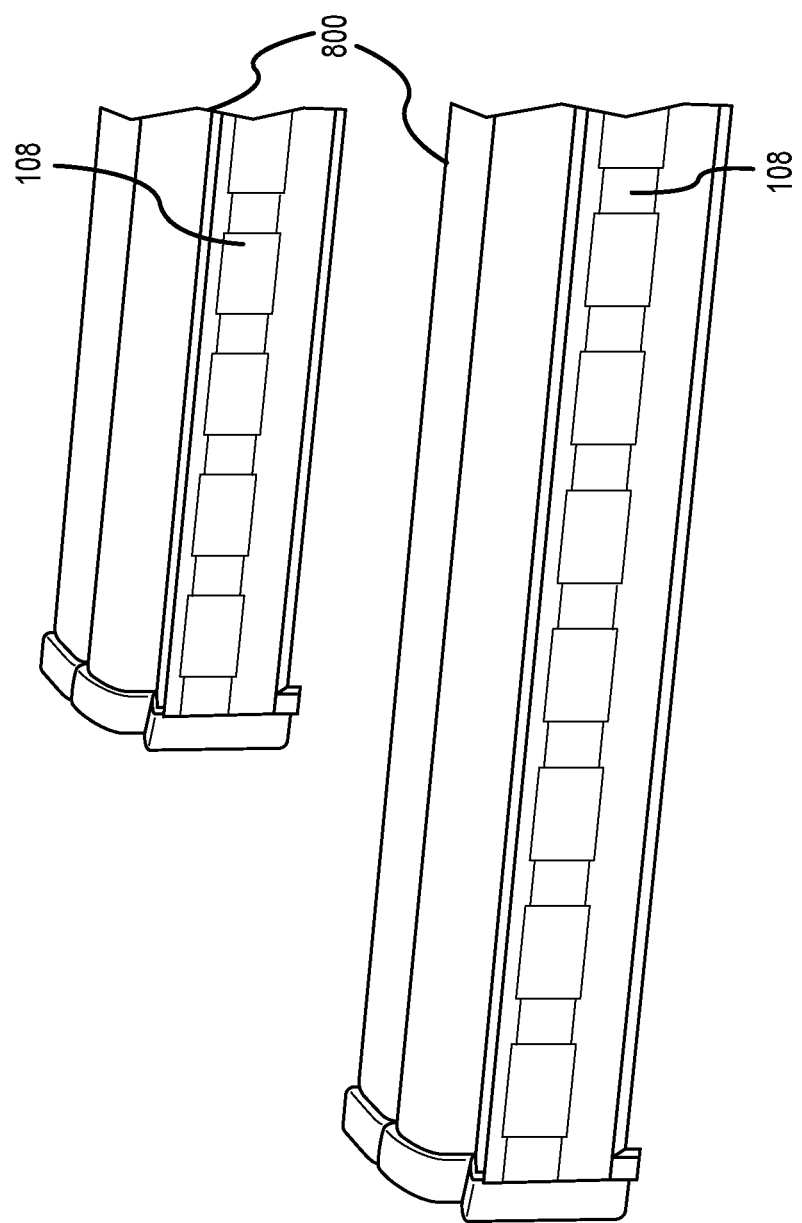
FIG. 8 illustrates a diagram of a lighting unit of an application for LED wash-lights, where the plurality of LEDs of various colors are mounted next to each other along a line in accordance with various embodiments.

In various embodiments, FIG. 8 illustrates a diagram of a lighting unit 800 of an application for LED wash lights, where the plurality of LEDs (light sources 108) of various colors are mounted next to each other along a line. The lighting unit 800 can be offered as mood light (using RGB-White-Amber LEDs), with the option to be NVIS compatible per MIL-SDT-3009, without any hardware modifications. In various embodiments, the lighting unit 800 may be configured for other applications including military transport aircrafts, as well as options that include White, NVIS White, and NVIS Green A combinations. In various embodiments, a common module can be used for different sets of MIL-STD-3009 requirements.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

System program instructions and/or controller instructions may be loaded onto a non-transitory, tangible computer-readable medium having instructions stored thereon that, in response to execution by the processor, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An article of manufacture including a tangible, non-transitory computer-readable storage medium having instructions stored thereon that, in response to execution by a processor, cause the processor to perform operations comprising:

command, by the processor, of a lighting system to achieve a target light color without exceeding a maximum limit of Night Vision Imaging Systems (NVIS) radiance while controlling a Melanopic-Photopic (M/P) ratio associated with the target light color; and determine, by the processor, a color mixing for producing NVIS Green A light and NVIS white light for a plurality of levels of NVIS radiance which are less than a maximum limit of NVIS radiance for a set of M/P ratio values at an upper allowable limit and a set of M/P ratio values at a lower limit.

2. The article of manufacture of claim 1, further comprising:

setting, by the processor, a visual color brightness comprising a set of values of NVIS Green A light and of a NVIS white light with high and low M/P ratios.

3. The article of manufacture of claim 2, further comprising:

operating, by the processor, a singular lighting device in a plurality of modes at least comprising an NVIS compatible mode and a visible mode without restrictions.

4. The article of manufacture of claim 3, wherein the singular lighting device is configured with a set of operating modules to correspond to the plurality of modes.

5. The article of manufacture of claim 4, further comprising:

setting, by the processor, the singular lighting device in at least one of the plurality of modes that at least comprise an NVIS compatible mode and a normal white light mode, while controlling a range of wavelength that induces a melanopic response.

6. The article of manufacture of claim 4, wherein the singular lighting device comprises a plurality of light emitting diodes (LEDs) configured in multiple light colors that are positioned in a linear manner to provide a mood lighting mode with at least an optional NVIS compatible mode.

7. A lighting system, comprising:

a plurality of light emitting diodes (LEDs); and a controller in operable communication with the plurality of LEDs, the controller configured to cause the plurality of LEDs to:

output a target light color below a maximum level of NVIS radiance while controlling a Melanopic-Photopic (M/P) ratio associated with the target light color; and determine a color mixing for producing NVIS Green A light and NVIS white light for a plurality of levels of NVIS radiance which are less than a maximum level of NVIS radiance associated with either an upper limit of an M/P ratio and a lower limit of an M/P ratio.

8. The lighting system of claim 7, wherein the controller is configured to adjust the plurality of LEDs to output the target color with a visual brightness that is below a maximum NVIS radiance value for NVIS light and associated with at least one of an NVIS green A light or a NVIS white light with the upper limit of the M/P ratio or the lower limit of the M/P ratio.

9. The lighting system of claim 8, wherein the controller is configured to operate a single lighting device in either an NVIS compatible mode or a visible mode wherein the visible mode is unrestricted.

10. The lighting system of claim 9, wherein the controller controls a plurality of modules disposed in the single lighting device that each operate in respective operating modes to output the target light color below an upper level of NVIS radiance while an M/P ratio is controlled.

11. The lighting system of claim 10, wherein the controller is configured to set a single light device in at least a mode that comprises an NVIS compatible mode or a normal white light mode.

12. The lighting system of claim 11, wherein the plurality of light emitting diodes (LEDs) disposed in the single light device to enable an output of multiple colors to provide at least a mood lighting mode and a NVIS compatible light mode.

13. A light assembly, comprising:
- a controller in operable communication with a light unit, the controller configured to:
- apply a lighting condition using the light unit comprising a target light color below an upper level of NVIS radiance while controlling a Melanopic-Photopic (M/P) ratio associated with the target light color; and
- determine a color mixing for producing NVIS Green A light and NVIS white light for a plurality of levels of NVIS radiance which are less than a maximum NVIS radiance level for a set of M/P ratio values at an upper allowable limit and a set of M/P ratio values at a lower limit.

14. The light assembly of claim 13, wherein the controller is configured to set a visual color brightness comprising a set of values of NVIS Green A light and of a NVIS white light with either the upper limit of the M/P ratio or the lower limit of the M/P ratio.

15. The light assembly of claim 14, wherein the controller is configured to operate a singular lighting device in a plurality of modes at least comprising an NVIS compatible mode and a visible mode without restrictions.

16. The light assembly of claim 15, wherein the singular lighting device is configured with a set of operating modules to correspond to the plurality of modes.

17. The light assembly of claim 16, wherein the controller is configured to set the singular lighting device in at least one of a plurality of modes comprising an NVIS compatible mode and a normal white light mode, while controlling a melanopic response.

18. The light assembly of claim 17, wherein the singular lighting device comprises a plurality of light emitting diodes (LEDs) configured in multiple light colors that are positioned in a linear manner to provide a mood lighting mode with an optional NVIS compatible mode.

19. The light assembly of claim 18, wherein the controller is configured to output an interior illumination of a mode comprising an active state of a low M/P ratio of NVIS Green A with NVIS goggles or another active state of a low M/P ratio with NVIS White without NVIS goggles.

20. The light assembly of claim 19, wherein the controller is configured to output a mode of the active state of the low M/P ratio with the NVIS Green A and the another active state of the low M/P ratio with the NVIS white without NVIS goggle.

* * * * *